Be it known that I, JOHN L. TUFTS, a citizen of the United States, residing at Winchester, in the county of Suffolk and State of Massachusetts, have invented new and useful Improvements in Dry Cement Processes and Products, of which the following is a specification.

My invention relates to dry cement processes and products; and its objects are to produce a more convenient and effective combination of the component parts, to furnish a dry product in a condition for ready and convenient use in preparing cement, to provide for the correction during the formation of my product of defects resulting from the impurities of the ingredients or irregularities in mixing the same, to effect a product of uniform properties and composition and to accomplish said objects in an economical and effective manner.

The essential ingredients of my improved product prior to being used in forming a cement ready for instant use are magnesium chlorid and magnesium oxid, and preferably water but not in such quantities as to cause the material to take a permanent set. These substances have, it is true, been heretofore used in the art for the purpose of forming cement products well known under the names "magnesium oxychlorid or Sorel cement," in the use of which the cementing ingredients as supplied are brought together on the ground and mixed. But such method of mixing and possible effect on the resulting product are open to very serious objections.

The present general practice in the use of magnesium oxychlorid cement in the building trade is to have a suitable aggregate mixed with calcined magnesite and at the time of use to add a solution of magnesium chlorid of exact strength as indicated by hydrometer to the above mixture to make it of the consistency of a mortar. The approved mixture in common use consists of about equal parts of magnesium chlorid and calcined magnesite with aggregate in addition combined with water double in amount to either of such parts. In a few hours the product sets up and is troweled much like granolithic work. The magnesium chlorid solution is either made up on the ground by the workmen from the crystals or fused chlorid which are by-products of the Stassfurt salts industry, or the solution of correct strength is shipped to the work.

Calcined magnesite, as supplied in the market, offers a possibility of variation in its magnesium oxid content on account, first, of variation of the raw material (which is a mineral product), second, on account of variation in calcining in commercial practice, or absorption of carbonic acid, (leaving partly undecomposed magnesium carbonate which if considerable makes an unsatisfactory cement) and, third, on account of its variation of moisture content due to its strong affinity for water.

Magnesium chlorid, as supplied in the market, is made by concentrating the mother liquors from the potash salts industry. It contains undesirable impurities and offers the possibility for variation in composition of liquor made up from same, with unsatisfactory results in the final product, when the strength of the solution is determined by hydrometer as is the general practice.

There has been practical inconvenience in the use of magnesium oxychlorid cement from the necessity of maintaining a supply of a solution of magnesium chlorid of standard strength in tanks, with opportunity for irregularities where the operation is in the hands of workmen, or expense and inconvenience in shipping liquor of standard strength in packages with the package cost, extra shipping weight and liability of loss from leakage. There has also been an opportunity for unreliability in the cement after it has become set from the possibility of the ingredients not being of good enough quality either as to the calcined magnesite in its original manufacture, or from the calcined magnesite having deteriorated through absorption of carbonic acid from the atmosphere, or from the absorption of water, or as to the magnesium chlorid in the possibility of foreign salts being present. There has also been a liability in practice of incorrect proportioning of the ingredients through mistake on the part of the workman or incorrect proportioning from the empirical way in which he is accustomed to bring the ingredients together with the possibility of the variation of the quality of either or both of the above mentioned ingredients.

My invention is essentially a dry cement product made by bringing together magnesium oxid and magnesium chlorid. Water may also be present and commercial magnesium oxid or chlorid may be used. This product may be mixed with suitable aggregate color and water proofing material if desired. This combination will then be ready for actual use by adding the requisite amount of water. It may be made by bringing together anhydrous magnesium oxid and anhydrous magnesium chlorid, and mixing them in proper amounts, or it may be made by using the magnesium oxid or chlorid where either or both contain more or less water, provided the resultant product is still dry and granular, an additional amount of water being required to bring the product into action as a cement.

This cement product is preferably made by treating commercial calcined magnesite in a powdered condition with hydrochloric acid gas and water vapor gradually and progressively, and preferably with agitation in a suitable agitating vessel, accompanied by the removal of heat of reaction in order to prodce a dry material containing magnesium chlorid, magnesium oxid and water in the proportions substantially as follows:

Magnesium chlorid_____ one molecule.
Magnesium oxid_____ five molecules.
Water_____ five molecules.

I do not however except in my preferred method limit myself to this proportion, since I have found that these quantities may be varied outside of these proportions and the product still have a cementing reaction, though not so satisfactory as with my preferred method.

I have also found that hydrochloric acid gas and water vapor may either or both be added to the commercial calcined magnesite in a greater or lesser amount than above indicated depending upon conditions and the product brought to the desired composition either by adding calcined magnesite in a more or less hydrous condition or hydrochloric acid gas or its solution in water (commercial muriatic acid) which may be atomized, or atomized water or water vapor, or magnesium chlorid in a more or less hydrous state or a combination of these materials, as may be permissible ultimately to attain my improved product.

To follow my process in its preferred form it is to be noted that by treating the commercial calcined magnesite with hydrochloric acid gas, moisture that has been absorbed since calcination simply takes its part in the reaction; the additional quantity of water which is added, for instance in the form of vapor, enabling the calcined magnesite to absorb hydrochloric acid gas up to the completion of the desired reaction. The carbonic acid which is present through incomplete calcination or through absorption is to a large extent eliminated by this treatment with consequent availability of the magnesium oxid with which it was combined. An additional quantity of water is then added in the form of steam or water vapor, after which there is further treatment with hydrochloric acid gas up to the completion of the desired reaction.

The advantages of this preferred process are, first, that the preparation of the cement material, except for the addition of the final water necessary to bring it into action, takes place at the point of manufacture where technical supervision may be conveniently supplied; second, that the magnesium oxid content of the final product is controlled accurately and conveniently; third, that corbonic acid is to a practical extent eliminated when present; fourth, that moisture in the calcined magnesite does not deteriorate the product but in fact, supplies a part of the water required in the process of manufacturing; fifth, that the magnesium chlorid content is controlled accurately and conveniently in the cement material in a definite proportion to the magnesium oxid which is, of course, of first importance in obtaining a reliable cement as well as utilizing the materials employed to the extent of their maximum availability; sixth, that where high grade materials are used the magnesium chlorid thus formed is substantially free from impurities which may cause efflorescence and other undesirable results; seventh, that the inconvenience of maintaining a supply of liquor with equipment cost or package cost, extra freight, and possibility of liquor leakage which go with the present practice, are avoided; eighth, that the cement material contains a sufficient amount of water in combination so that its affinity for more water is very materially reduced (in that a mixture made up by the use of anhydrous calcined magnesite without magnesium chlorid present, will heat up to an intense degree with addition of moisture, while my preferred product does not heat up on the addition of moisture) a circumstance which increases the possibility for long storage without deterioration, as well as making it a safe material as regards overheating in storage, and possible conflagration; ninth, that by making up the cement in bags of uniform weight, the correct proportion of water to be added to bring the cement into proper action may be marked on the package and in case of any gain in weight through absorption of moisture, the proper correction can be made conveniently by deducting the gain in weight from the figure as marked on the package to give the correct amount of water to be added; and, tenth, that finally the only operation left in the hands of the workmen to obtain a working cement of standard strength and correct proportion is the addition of this definite amount of water in mixing up the cement, thereby furnishing a material that is much more available and reliable for use in the industry and arts generally.

The economy of my preferred method is based on the fact that hydrochloric acid gas at the place of manufacture is not an expensive material, and the process as indicated is simple and inexpensive to operate and readily adapts itself to commercial practice. Furthermore an exact regulation of the hydrochloric acid and water vapor to magnesium oxid may easily be obtained from the fact that the calcined magnesite will only absorb hydrochloric acid gas to the extent of the proportion two molecules weight for every four molecules weight of water present when the water is added in steps or gradually as absorption proceeds. Therefore, where the ultimate amount of water to the original amount of magnesium oxid is of the molecular proportion five to six, the ultimate product is my preferred cement material in accordance with the following reaction when anhydrous hydrochloric acid gas ceases to be absorbed:—

$$4H_2O + 6MgO + 2HCl = MgCl_2.5MgO.5H_2O$$

It should be noted that if all the water as figured is added at once after anhydrous hydrochloric acid gas ceases to be absorbed, it will be necessary to add an additional amount of water before sufficient anhydrous hydrochloric acid will be absorbed to give the preferred cement material.

Where commercial magnesium chlorid and commercial magnesia are used in my process much greater care has to be exercised than in my preferred form of method above described, and the particular condition of the ingredients as well as the work in which the cement is to be used are factors to be considered.

For the magnesium chlorid constituent of my improved product. I may in some instances prefer to use commercial magnesium chlorid which is fused to remove hygroscopic moisture and to render it suitable for pulverizing, after which such constituent is mixed with the magnesium oxid to form a dry cement product. I may also in other instances prefer to employ in place of the above product (which contains water in the proportion of five molecular weights to one molecular weight of magnesium chlorid) a product which contains water in the proportion of four molecular weights to one molecular weight of magnesium chlorid approximately. This latter product may be prepared by melting commercial magnesium chlorid as above with gentle gradually increasing heat and stirring in a suitable apparatus, to a temperature preferably not appreciably exceeding one hundred and eighty degrees centigrade, and continuing the heating and stirring during the crystallizing and drying out of the granular product of the above proximate composition. I am aware that a very slight loss of hydrochloric acid occurs in this process of partial dehydration of commercial magnesium chlorid with formation of a slight scum. This loss however is not practically appreciable if care is used while a more desirable material for the preparation of a dry cement product will be obtained. The disadvantage, however, remains for these two products that if the commercial magnesium chlorid is not of good enough quality the undesirable impurities contaminate the final product.

What I claim and desire to secure by Letters Patent is:—

1. A process for making a dry cement product, consisting in agitating calcined magnesite in a closed vessel, and introducing therein during said agitation amounts of hydrochloric acid gas and water vapor sufficient to produce a product containing the proportion of five molecules of magnesium oxid, one molecule of magnesium chlorid and five molecules of water.

2. A powdered cement comprising a mixture of five molecules of magnesium oxid, one molecule of magnesium chlorid, and approximately five molecules of water.

In testimony whereof I have hereunto set my hand in presence of two subscribing witnesses, this 31st day of January, 1914.

JOHN L. TUFTS.

Witnesses:
 HERBERT M. CHASE,
 JOSEPH H. KNIGHT.